(12) United States Patent
Lee et al.

(10) Patent No.: US 7,819,138 B2
(45) Date of Patent: Oct. 26, 2010

(54) MICROFLUIDIC DEVICE USING CENTRIFUGAL FORCE AND PUMP TO CONTROL FLUID MOVEMENT, MICROFLUIDIC SYSTEM COMPRISING THE SAME AND METHOD OF MANUFACTURING THE MICROFLUIDIC DEVICE

(75) Inventors: Hun-joo Lee, Gyeonggi-do (KR); Nam Huh, Gyeonggi-do (KR); Soo-suk Lee, Gyeonggi-do (KR); Sung-ouk Jung, Gyeonggi-do (KR); Soo-hyung Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 388 days.

(21) Appl. No.: 11/869,835

(22) Filed: Oct. 10, 2007

(65) Prior Publication Data

US 2008/0135101 A1    Jun. 12, 2008

(30) Foreign Application Priority Data

Dec. 6, 2006    (KR)    ............ 10-2006-0123393

(51) Int. Cl.
*F15C 1/04*    (2006.01)
(52) U.S. Cl. .................... 137/827; 137/38; 422/100
(58) Field of Classification Search ........... 137/251.1, 137/825, 827, 38, 571; 251/11, 129.01; 422/99, 422/100, 103
See application file for complete search history.

(56) References Cited

U.S. PATENT DOCUMENTS

| | | | | |
|---|---|---|---|---|
| 5,256,376 | A * | 10/1993 | Callan et al. | 422/102 |
| 6,582,662 | B1 * | 6/2003 | Kellogg et al. | 422/72 |
| 6,812,457 | B2 * | 11/2004 | Andersson et al. | 250/288 |
| 6,878,555 | B2 * | 4/2005 | Andersson et al. | 436/180 |
| 7,329,391 | B2 * | 2/2008 | Cox | 422/100 |
| 7,465,545 | B2 * | 12/2008 | Kim et al. | 435/6 |
| 2002/0047003 | A1 * | 4/2002 | Bedingham et al. | 219/388 |
| 2007/0034270 | A1 * | 2/2007 | Yang et al. | 137/833 |

(Continued)

OTHER PUBLICATIONS

Moschou E A, Nicholson A D, Jia G, Zoval J V, Madou M J, Bachas L G, Daunert S. "Integration of micocolumns and microfluidic fractionators on multitasking centrifugal platforms for the analysis of biomolecules." Analytical and Bioanalytical Chemistry 385:3, (Jun. 2006): 596-605.*

(Continued)

*Primary Examiner*—John Rivell
*Assistant Examiner*—Craig Price
(74) *Attorney, Agent, or Firm*—Cantor Colburn LLP (57) ABSTRACT

The microfluidic device includes a rotatable platform, a plurality of connection ports disposed at a portion of the platform proximate to a shaft connection hole, the plurality of connection ports capable of being connected to an external connector for selectively injecting and discharging fluid and being closed by the connector, a trap chamber disposed at a portion of the platform further away from the shaft connection hole than the plurality of connection ports, the trap chamber including an inlet connected with at least one connection port of the plurality of connection ports, an outlet connected with another connection port of the plurality of connection ports and structures which enlarge a contact area with the fluid and a temporary storage including an inlet connected with the outlet of the trap chamber and an outlet connected with another connection port of the plurality of connection ports.

23 Claims, 6 Drawing Sheets

U.S. PATENT DOCUMENTS

2007/0086922 A1* 4/2007 Andersson et al. .......... 422/100

OTHER PUBLICATIONS

Pra M D, Kok W T, Gardeniers J G E, Desmet G, Eeltink S, van Nieuwkasteele J W, Schoenmakers P J. "Experimental Study on Band Dispersion in Channel Structures with Micropillars." Anal Chem 78, (2006): 6519-6525.*

Madou M J, Lee L J, Daunert S, Lai S, Shih C-H. "Design and Fabrication of CD-like Microfluidic Platforms for Diagnostics: Microfluidic Functions." Biomedical Microdevices 3:3 (2001): 245-254.*

Miao J, Wu W, Spielmann T, Belfort M, Derbyshire V, Belfort G. "Single-step affinity purification of toxic and non-toxic proteins on a fluidics platform." Lab on a Chip 5 (2005): 248-253.*

* cited by examiner

MICROFLUIDIC DEVICE USING CENTRIFUGAL FORCE AND PUMP TO CONTROL FLUID MOVEMENT, MICROFLUIDIC SYSTEM COMPRISING THE SAME AND METHOD OF MANUFACTURING THE MICROFLUIDIC DEVICE

This application claims priority to Korean Patent Application No. 10-2006-0123393, filed on Dec. 6, 2006, and all the benefits accruing therefrom under 35 U.S.C. §119, the contents of which in its entirety are herein incorporated by reference.

BACKGROUND OF THE INVENTION

1. Field of the Invention

The present invention relates to a microfluidic device which controls a fluid movement and a microfluidic system comprising the same, and more particularly, to a microfluidic device employing a fluid movement using centrifugal force and a fluid movement using a pump, and a microfluidic system comprising the same.

2. Description of the Related Art

A microfluidic device includes a chamber which stores a minute amount of fluid, a channel through which the fluid flows and a valve which controls fluid flow. A biochip is formed by arranging such microfluidic devices on a chip-type substrate and is used to analyze a performance of various assays, including biological reactions. Particularly, a device that is designed to perform multiple step processes and manipulations using a single chip is called a lab-on-a chip ("LOC").

A driving pressure is generally required in order to transfer the fluid within a microfluidic device. A capillary pressure or a pressure generated by a specifically prepared pump is used as the driving pressure. A lab compact disk ("CD") is a recently introduced microfluidic device which is formed by arranging microfluidic structures on a compact disk-shaped platform and which uses centrifugal force. In a case of a microfluidic device using centrifugal force to control a fluid movement, the fluid movement is limited to an outward direction from a rotation shaft. Therefore, a chamber where a fluid movement starts, such as a sample chamber, should be disposed at a portion of the microfluidic device proximate to the rotation shaft. However, it is difficult to obtain an area close to the rotation shaft for mounting chamber structures having a large volume because the portion of the microfluidic device proximate to the rotation shaft has a relatively small area, as compared to a portion further away from the rotation shaft. Also, a rotation speed of the microfluidic device should be limited such that a valve can resist the rotation of the microfluidic device or such that a channel can serve as a valve during a fluid movement.

In a case of the microfluidic device using a pump to move a fluid, it is difficult to collect a solution which remains between pillars or beads by using a capillary force in a trap chamber which includes a plurality of pillar structures or packed beads.

BRIEF SUMMARY OF THE INVENTION

An exemplary embodiment of the present invention provides a microfluidic device employing a fluid movement using centrifugal force and a fluid movement using a pump, and a microfluidic system including the same.

An exemplary embodiment of the present invention also provides a disk-shaped microfluidic device which efficiently uses a relatively large area further from a shaft connection hole of the disk-shaped microfluidic device by using a centrifugal force in order to control a fluid movement and which allows a fluid movement in an inward direction from a perimeter of the microfluidic device and thus does not require a valve between chambers, thereby removing a limitation of rotation speed due to a weak valve.

According to an exemplary embodiment of the present invention, there is provided a microfluidic device including a rotatable platform, a plurality of connection ports disposed at a portion of the platform proximate to a shaft connection hole disposed in the platform, the plurality of connection ports capable of being connected to an external connector for selectively injecting and discharging fluid and being closed by the external connector, a trap chamber disposed at a portion of the platform further away from the shaft connection hole than the plurality of connection ports, the trap chamber including an inlet, an outlet and structures, the inlet connected with at least one connection port of the plurality of connection ports, the outlet connected with another connection port of the plurality of connection ports and the structures enlarge a contact area with the fluid and a temporary storage disposed at a portion of the platform further away from the shaft connection hole than the trap chamber, the temporary storage including an inlet and an outlet, the inlet connected with the outlet of the trap chamber and the outlet connected with another connection port of the plurality of connection ports, and the temporary storage stores the fluid discharged from the trap chamber by centrifugal force during a rotation of the platform.

In an exemplary embodiment, the rotatable platform may be disk-shaped.

In an exemplary embodiment, the structures in the trap chamber may be a plurality of packed beads. However, the present invention is not limited thereto, and the structures may be structures of various shapes, for example, a pillar-shape.

In exemplary embodiments, the structures such as beads may include surfaces coated with a material to which a specific material can be attached among materials contained within a fluid and thus may detach or concentrate the specific material contained within a fluid.

In exemplary embodiments, the temporary storage may be configured in a chamber or a channel and include a volume larger than or equal to an effective volume of the trap chamber, except for a volume of the internal structures in the trap chamber.

In exemplary embodiments, the plurality of connection ports, the trap chamber and the temporary storage may be connected with each other through channels.

In exemplary embodiments, the microfluidic device may further include a sample chamber disposed at a portion of the platform further away from the shaft connection hole than the plurality of connection ports, wherein an inlet of the sample chamber is connected with one connection port of the plurality of connection ports and an outlet of the sample chamber is connected with the inlet of the trap chamber, and the sample chamber stores a fluid sample therein.

According to another exemplary embodiment of the present invention, there is provided a microfluidic device including a rotatable platform, a plurality of connection ports disposed at a portion of the platform proximate to a shaft connection hole disposed in the platform, the plurality of connection ports capable of being opened for selectively injecting or discharging fluid through a connection with an external connector, or being closed and a plurality of trap chamber modules, wherein each trap chamber module of the plurality of trap chamber modules includes a trap chamber disposed at a portion of the platform further away from the shaft connection hole than the plurality of connection ports, the trap chamber including an inlet, an outlet and structures, the inlet connected with at least one connection port of the plurality of connection ports, the outlet connected with another connection port of the plurality of connection ports and the structures enlarge a contact area with the fluid and a temporary storage disposed at a portion of the platform further away from the shaft connection hole than the trap chamber, the temporary storage including an inlet and an outlet, the inlet connected with the outlet of the trap chamber and the outlet connected with another connection port of the plurality of connection ports, and the temporary storage stores the fluid discharged from the trap chamber by centrifugal force during a rotation of the platform, wherein an outlet of the temporary storage of an upstream trap chamber module is connected with an inlet of the trap chamber of a downstream trap chamber module corresponding to a movement direction of the fluid.

In an exemplary embodiment, the structures in the trap chamber may be a plurality of packed beads. However, the present invention is not limited thereto, and the structures may be structures of various shapes, for example, a pillar-shape. In an exemplary embodiment, the structures such as beads may include surfaces coated with a material to which a specific material can be attached among materials contained within the fluid and thus may detach or concentrate the specific material contained within the fluid.

In an exemplary embodiment, the temporary storage may be configured in a chamber or a channel and have a volume larger than or equal to an effective volume of the trap chamber, except for a volume of the structures in the trap chamber.

In an exemplary embodiment, the plurality of connection ports, the trap chamber and the temporary storage may be connected with each other through channels.

In an exemplary embodiment, the microfluidic device may further include a sample chamber disposed at a portion of the platform further away from the shaft connection hole than the plurality of connection ports, wherein an inlet of the sample chamber is connected with one connection port of the plurality of connection ports and an outlet of the sample chamber is connected with the inlet of the trap chamber of a most upstream trap chamber module among the plurality of trap chamber modules, and the sample chamber stores a fluid sample therein.

According to another exemplary embodiment of the present invention, there is provided a microfluidic system including one microfluidic device of the above-mentioned microfluidic devices, a rotating mount which controls a rotation speed and an angular position while supporting the microfluidic device and a connector including a plurality of connection passages respectively corresponding to the plurality of connection ports disposed in the microfluidic device, and pipes and valves respectively connected with the plurality of connection passages, the connector capable of being connected with and separated from the plurality of connection ports of the microfluidic device, wherein the connector is connected with the plurality of connection ports of the microfluidic device when moving fluid in the microfluidic device using an external pump, fluid that is pressurized by using the external pump is injected into at least one connection passage of the plurality of connection passages and remaining connection passages of the plurality of connection passages are selectively opened or closed using the respective valves, and the connector is separated from the microfluidic device when moving fluid in the microfluidic device by using centrifugal force.

According to another exemplary embodiment of the present invention, there is provided a method of manufacturing the above-mentioned microfluidic devices.

BRIEF DESCRIPTION OF THE DRAWINGS

The above and/or other aspects, features and advantages of the present invention will now become more apparent by describing in detail exemplary embodiments thereof with reference to the attached drawings, in which.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

The present invention will now be described more fully with reference to the accompanying drawings, in which exemplary embodiments of the invention are shown.

Figure 1:
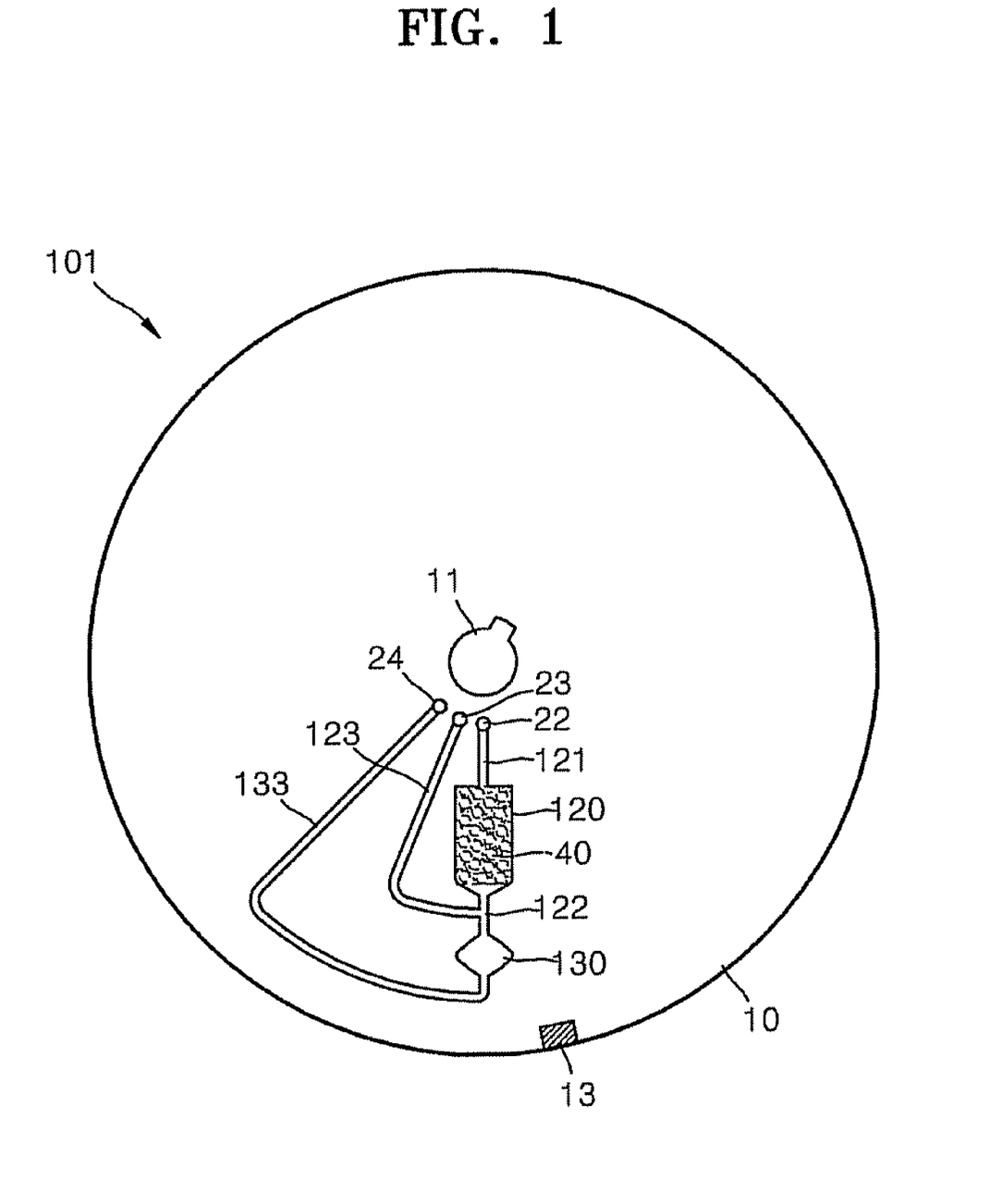
FIG. 1 illustrates a schematic top plan view of an exemplary embodiment of a microfluidic device according to the present invention.

FIG. 1 illustrates a schematic top plan view of an exemplary embodiment of a microfluidic device 101 according to the present invention. The microfluidic device 101 includes a microfluidic structure including a plurality of channels and chambers formed in a disk-shaped platform 10. In exemplary embodiments, the platform 10 may be formed of a plastic material such as polycarbonate ("PC"). The technology for forming microfluidic structures, such as channels, chambers and the like is well known in the art. In exemplary embodiments, a shaft connection hole 11 may be formed in a center or a central portion of the platform 10, and a rotation shaft (not shown) may be inserted into the shaft connection hole 11. The rotation shaft (not shown) and the shaft connection hole 11 may be engaged with each other so as to allow the platform 10 to smoothly rotate on the rotation shaft. An align key 13 is formed in at least a portion of the platform 10. The align key 13 provides data about a current angular position such that the microfluidic device 101 can be aligned at a desired angular position.

Referring to FIG. 1, a plurality of connection ports 22, 23 and 24 are formed proximate to the shaft connection hole 11 formed in the platform 10. A trap chamber 120 is disposed further away from the shaft connection hole 11 than the plurality of connection ports 22, 23 and 24. The trap chamber 120 includes structures in order to enlarge a contact area with a fluid. A temporary storage 130 is disposed further away from the shaft connection hole 11 than the trap chamber 120 in order to store fluid discharged from the trap chamber 120, when using a centrifugal force. In exemplary embodiments, the internal structures of the trap chamber 120 may be a plurality of packed beads 40. However, the present invention is not limited thereto, and the internal structures of the trap chamber 120 may be a plurality of pillar-shaped structures. An inlet of the trap chamber 120 is connected with the connection port 22 through an injection channel 121, an outlet of the trap chamber 120 is connected with an inlet of the temporary storage 130 through an intermediate channel 122 and the intermediate channel 122 is connected with the connection port 23 through an intermediate discharge channel 123. An outlet of the temporary storage 130 is connected with the connection port 24 through a discharge channel 133. The temporary storage 130 temporarily stores fluid when the fluid filled in the trap chamber 120 is discharged by centrifugal force. In exemplary embodiments, the temporary storage 130 may be a chamber or a channel, provided that the temporary storage 130 includes a space which can sufficiently receive the fluid filled in the trap chamber 120.

An operation of the microfluidic device 101 according to the current exemplary embodiment will now be described. A fluid sample is injected into the connection port 22 which is connected to the inlet of the trap chamber 120 by using a pump when the microfluidic device 101 is stopped. Here, when the connection port 23 which is connected to the intermediate discharge channel 123 is opened, and the connection port 24 which is connected to the discharge channel 133 is closed, the fluid sample passing through the trap chamber 20 flows into the connection port 23 through the intermediate discharge channel 123.

When the microfluidic device 101 is rotated in a state where the fluid sample is filled in the trap chamber 120, the fluid sample moves into the temporary storage 130 by centrifugal force. When the microfluidic device 101 is stopped and air is injected into the connection port 22 by using a pump while closing the connection port 23, which is connected with the intermediate discharge channel 123, the fluid sample which is stored in the temporary storage 130 is thereby discharged through the discharge channel 133 and through the connection port 24, which is connected with the discharge channel 133.

In exemplary embodiments, the centrifugal force, as described above, may be used in a section where the use of the centrifugal force is favorable to a fluid movement, for example, a section where fluid is discharged from the trap chamber 120 to the temporary storage 130, and the fluid sample may be moved by injecting the fluid sample or air into the connection ports 22, 23 and 24 in other sections.

Figure 2:
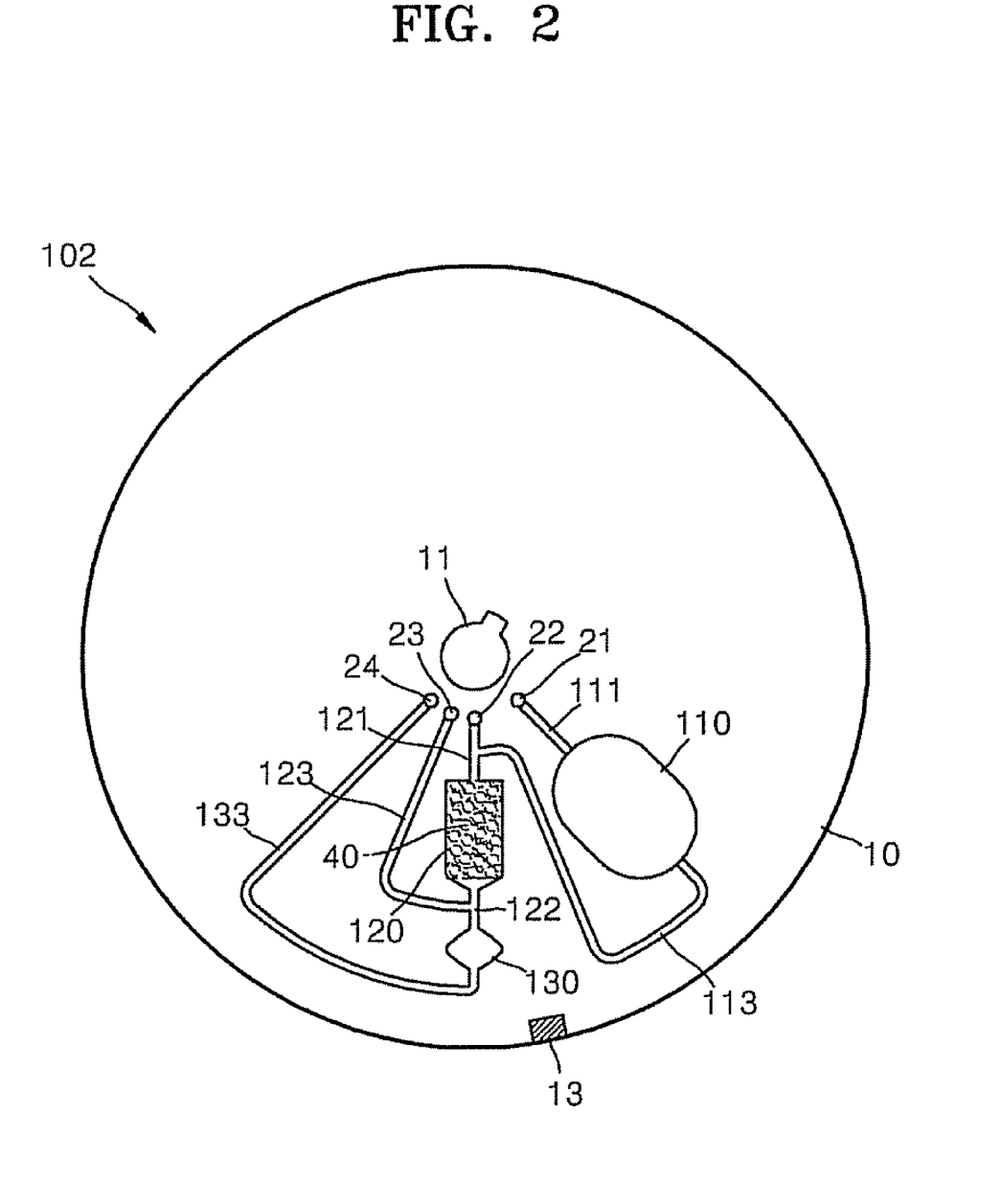
FIG. 2 illustrates a schematic top plan view of another exemplary embodiment of a microfluidic device according to the present invention.

FIG. 2 illustrates a schematic top plan view of another exemplary embodiment of a microfluidic device 102 according to the present invention. The microfluidic device 102 includes a same configuration as the microfluidic device 101, except that the microfluidic device 102 further includes a sample chamber 110. An inlet of the sample chamber 110 is connected with a connection port 21 through an injection channel 111 and an outlet of the sample chamber 110 is connected with the inlet of the trap chamber 120. In an exemplary embodiment, the outlet of the sample chamber 110 is connected with the injection channel 121 of the trap chamber 120, through the discharge channel 113.

In exemplary embodiments, the sample chamber 110 may be disposed proximate to a circumference of the microfluidic device 102, that is, a portion of the microfluidic device 102 which has more space, as compared to a portion closer to the shaft connection hole 11. In exemplary embodiments, a fluid sample may be injected into the sample chamber 110 through the connection port 21 which is connected with the injection channel 111. When air is injected into the sample chamber 110 through the connection port 21 in a state where the fluid sample is filled in the sample chamber 110, the fluid sample moves into the trap chamber 120 through the discharge channel 113. In the current exemplary embodiment, the connection port 22 which is connected with the injection channel 121 of the trap chamber 120 may be closed in order to prevent leakage of the fluid sample.

Figure 3:
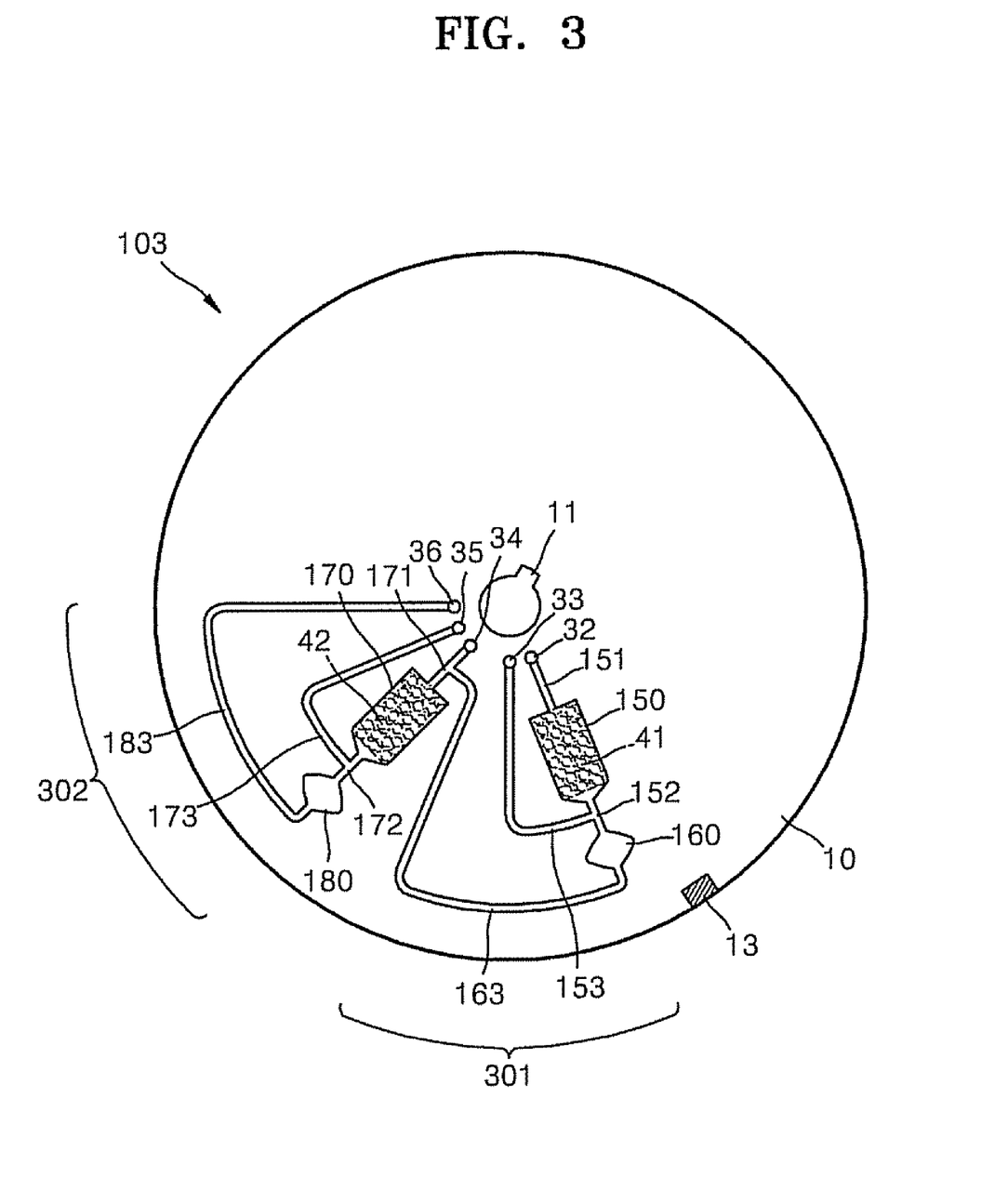
FIG. 3 illustrates a schematic top plan view of another exemplary embodiment of a microfluidic device according to the present invention.

FIG. 3 illustrates a schematic top plan view of another exemplary embodiment of a microfluidic device 103 according to the present invention. The microfluidic device 103 includes first and second trap chamber modules 301 and 302, respectively, in a platform 10. The first and second trap chamber modules 301 and 302 include trap chambers 150 and 170, temporary storages 160 and 180, a plurality of connection ports 32 to 36 and a plurality of channels 151, 152, 153, 163, 171, 172, 173 and 183 for connecting the above-mentioned structures with each other, respectively. Each of the trap chamber modules 301 and 302 includes a same configuration as the microfluidic structure described with respect to the microfluidic device 101, as illustrated in FIG. 1. A discharge channel 163 of the first trap chamber module 301 is connected with an inlet of the trap chamber 170 of the second trap chamber module 302. In an exemplary embodiment, the discharge channel 163 of the first trap chamber module 301 is connected with an injection channel 171 which connects the trap chamber 170 with the connection port 34. In the current exemplary embodiment, the microfluidic device 103 includes the two trap chamber modules 301 and 302, however the present invention is not limited thereto and more trap chamber modules may be arranged in series. The phrase "series arrangement" means that an outlet of an upstream module is connected with an inlet of a downstream module. For example, an outlet of the chamber module 301 is connected with an inlet of the chamber module 302.

An exemplary embodiment of an operation of the microfluidic device 103 will now be described. A fluid is discharged from the first trap chamber module 301 through the discharge channel 163 according to a same process as that described with reference to the first embodiment, i.e., microfluidic device 101. However, the discharged fluid is transferred into the trap chamber 170 of the second trap chamber module 302, and is not discharged to the connection port 34.

Figure 4:
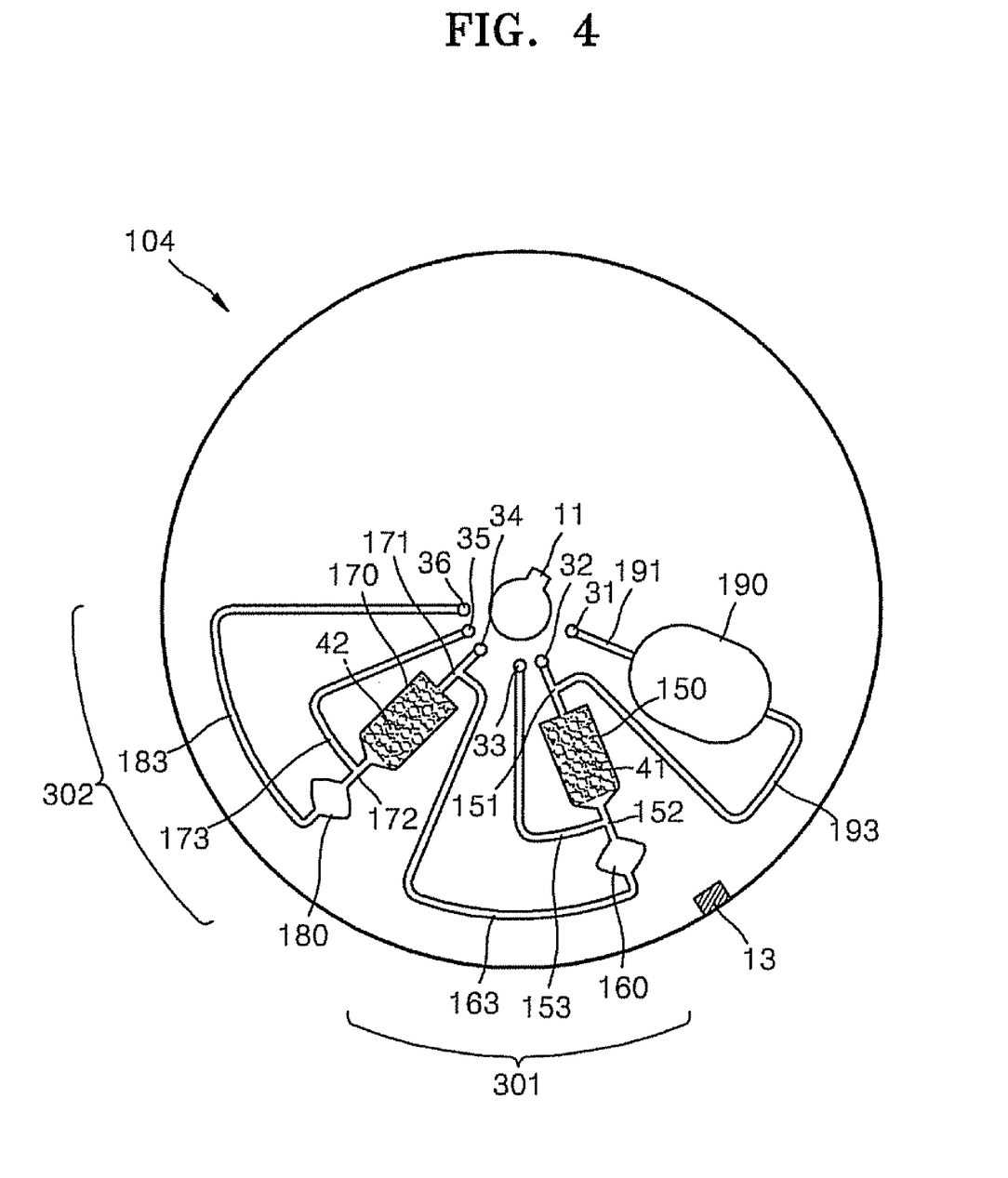
FIG. 4 illustrates a schematic top plan view of another exemplary embodiment of a microfluidic device according to the present invention.

FIG. 4 illustrates a schematic top plan view of another exemplary embodiment of a microfluidic device 104 according to the present invention. The microfluidic device 104 includes a same configuration as the microfluidic device 103, except that the microfluidic device 104 further includes a sample chamber 190. An inlet of the sample chamber 190 is connected with a connection port 31 through an injection channel 191 and an outlet of the sample chamber 190 is connected with the inlet of the trap chamber 150 of the first trap chamber module 301 through a discharge channel 193. In an exemplary embodiment, the outlet of the sample chamber 190 is connected with the injection channel 151 of the trap chamber 150.

Hereinafter, a process of extracting bacteria DNA from saliva using the microfluidic device 104 will be described as an exemplary embodiment of an operation of the microfluidic device according to the present invention. For convenience of description and understanding, the connection port 31 which is connected with the injection channel 191 of the sample chamber 190 will be referred to as the first port 31, and the ports 32 to 36 will be referred to as the second port 32 through the sixth port 36, in clockwise order. Also, the trap chamber 150 of the first trap chamber module 301 will be referred to as the first trap chamber 150, and the trap chamber 170 of the second trap chamber module 302 will be referred to as the second trap chamber 170. The other elements will be referred to in the same way as discussed above.

In the current exemplary embodiment, surfaces of beads 41 disposed in the first trap chamber 150 are processed such that they can be specifically bound with bacteria, and surfaces of beads 42 in the second trap chamber 170 are processed such that they can be specifically bound with DNA of bacteria.

Saliva is injected into the sample chamber 190 through the first port 31. Next, air is injected into the first port 31 using a pump in order to transfer the saliva in the sample chamber 190 into the first trap chamber 150. Here, the second port 32 and the fourth port 34 are closed, and the third port 33 is opened, thereby allowing the saliva passing through the first trap chamber 150 to be discharged through the first intermediate discharge channel 153. Bacteria included in the saliva are attached onto surfaces of the beads 41 in the first trap chamber 150 through such a process.

Next, a washing buffer is injected into the second port 32 by using a pump. Here, all of the ports, except for the second and third ports 32 and 33, are closed, and thus the washing buffer which passes through the first trap chamber 150 is discharged through the first intermediate discharge channel 153. Other components of the saliva are washed out, except for the bacteria which are attached onto the surfaces of the beads 41.

A lysis buffer then is injected into the first trap chamber 150 in the same manner as the washing buffer injection. After cell membranes of the bacteria are destroyed by the lysis buffer, a cell solution disposed in the first trap chamber 150 is then transferred to the first temporary storage 160 through the first intermediate channel 152 by using centrifugal force while rotating the microfluidic device 104.

Next, the cell solution which is stored in the first temporary storage 160 is then transferred into the second trap chamber 170 by using a pump when the microfluidic device 104 is stopped. Here, air is injected into the second port 32 and the remaining ports, except for the fifth port 35, are closed, and thus the cell solution which passes through the second trap chamber 170 is discharged through the second intermediate discharge channel 173. DNA of bacteria contained in the cell solution is then attached onto surfaces of the beads 42 disposed in the second trap chamber 170 through such a process.

A washing buffer is then injected into the fourth port 34 by using a pump. Here, the remaining ports are closed, except for the fourth and fifth ports 34 and 35, and thus the washing buffer which passes through the second trap chamber 170 is discharged through the second intermediate discharge channel 173. Other components of the cell solution, except for the DNA of the bacteria which are attached onto the surfaces of the beads 42, are washed out through such a process.

An elution buffer is then injected into the second trap chamber 170 in the same manner as the washing buffer injection. The DNA attached onto the surfaces of the beads 42 disposed in the second trap chamber 170 is eluted with the elution buffer. After the DNA is eluted, the cell solution in the second trap chamber 170 is transferred into the second temporary storage 180 through the second intermediate channel 172 by using centrifugal force while rotating the microfluidic device 104.

Next, a DNA solution which is stored in the second temporary storage 180 is discharged through the second discharge channel 183 by using a pump when the microfluidic device 104 is stopped. Here, air is injected into the fourth port 34 and the remaining ports, except for the sixth port 36, are closed.

Figure 5:
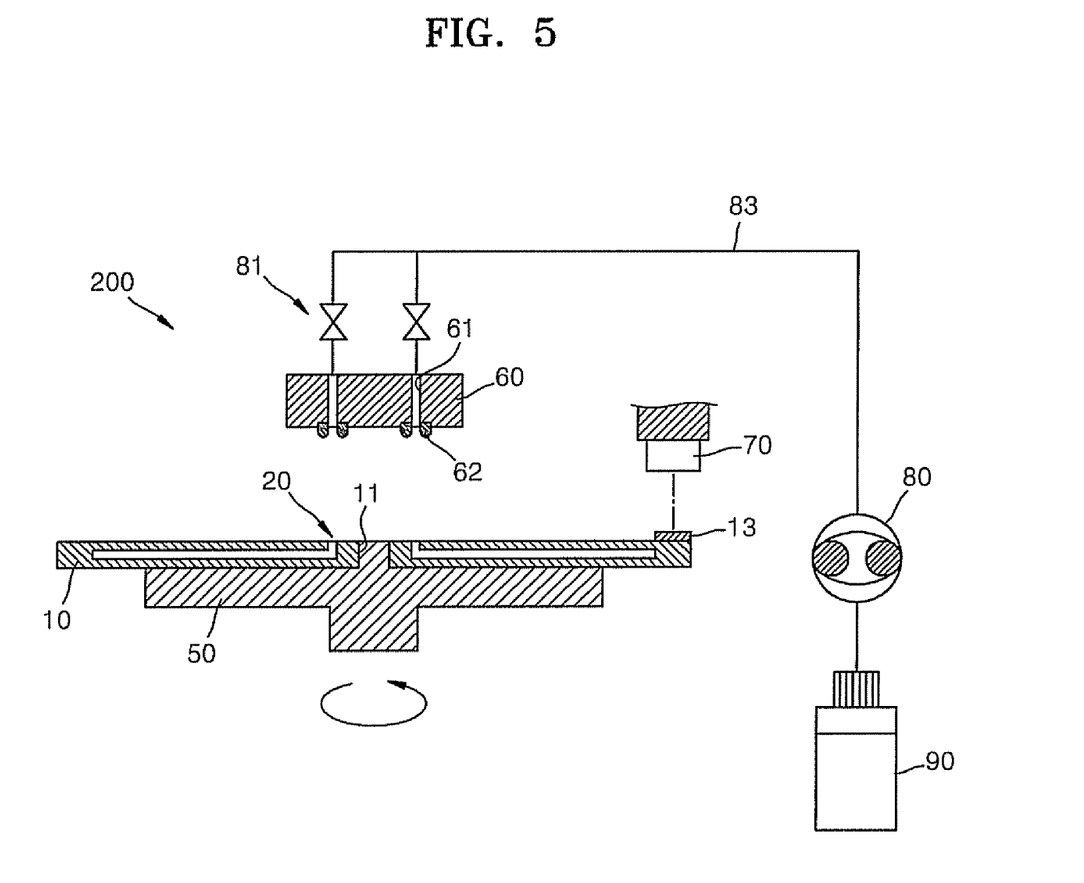
FIG. 5 illustrates a cross-sectional schematic diagram view of an exemplary embodiment of a microfluidic system wherein a fluid movement is controlled using centrifugal force according to the present invention.
Figure 6:
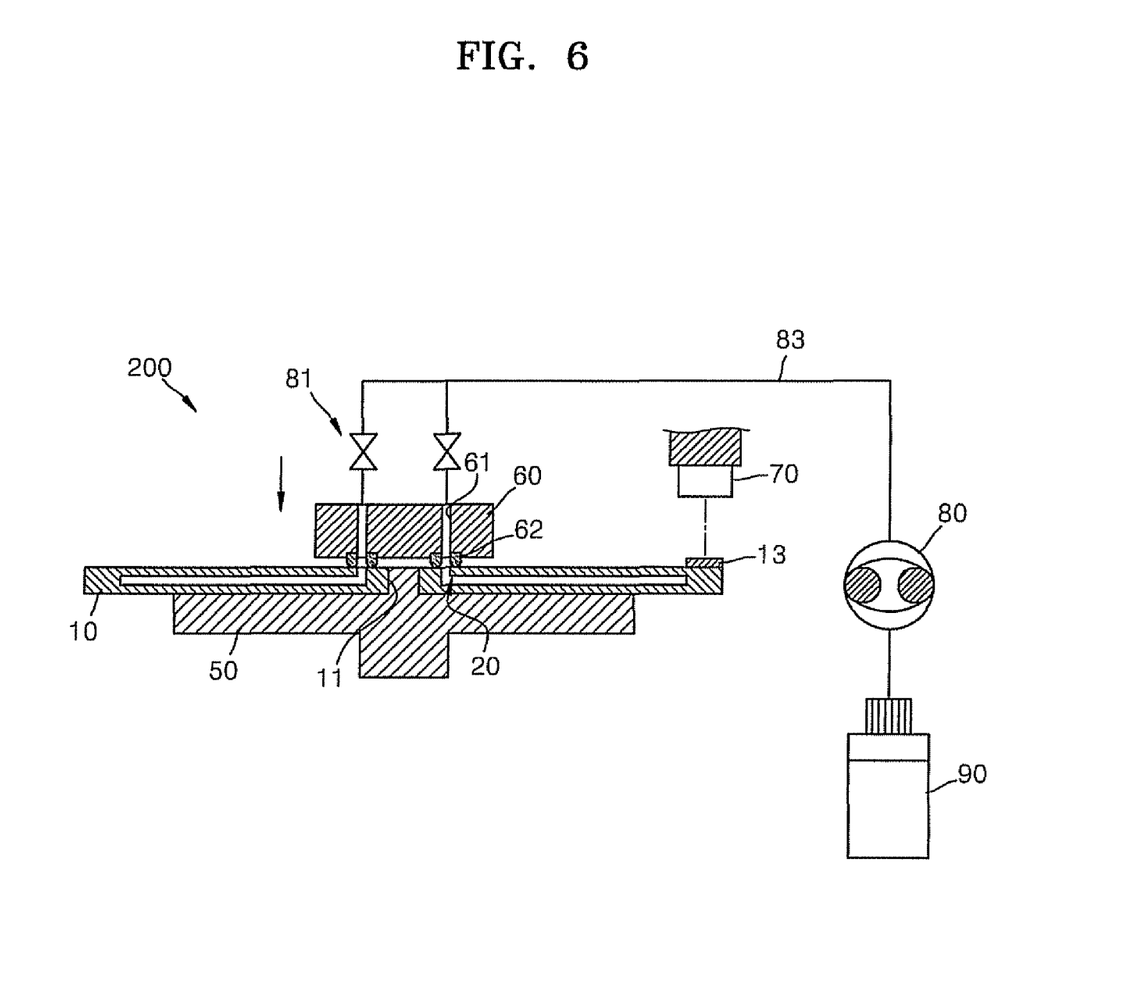
FIG. 6 illustrates a cross-sectional schematic diagram view of an exemplary embodiment of a microfluidic system wherein a fluid movement is controlled using a pump according to the present invention.

FIG. 5 illustrates an exemplary embodiment of a microfluidic system 200 wherein a fluid movement is controlled by using centrifugal force according to the present invention, and FIG. 6 illustrates the exemplary embodiment of a microfluidic system 200 wherein a fluid movement is controlled by using a pump according to the present invention. The microfluidic system 200 according to the current exemplary embodiment of the present invention includes one microfluidic device of the microfluidic devices 101 to 104, a rotating mount 50 and a connector 60. The rotating mount 50 controls a rotation speed and an angular position while supporting the microfluidic device. The connector 60 includes a plurality of connection passages 61 which respectively correspond to a plurality of connection ports 20 which are formed in the microfluidic device, and pipes 83 and valves 81 respectively connected with the plurality of connection passages 61. The connector 60 is capable of being connected with or separated from the connection ports 20 of the microfluidic device. In an exemplary embodiment, a center or a central portion of the rotating mount 50 may protrude in order to be inserted into the shaft connection hole 11 which is formed at a center or a central portion of the platform 10. In exemplary embodiments, the microfluidic system 200 of the present invention may include a position detector 70 which detects a position of the align key 13, which is disposed at a side of the platform 10, in order to detect an angular position of the microfluidic device.

According to the current exemplary embodiment, the connector 60 is capable of being connected with or separated from the connection ports 20 of the microfluidic device by moving downward and upward, respectively. In an exemplary embodiment, a sealing member 62 may be disposed at a portion of the connector 60 which contacts each connection port 20 such that a fluid does not leak out when each connection port 20 is connected with each corresponding connection passage 61. In an exemplary embodiment, the valves 81 are provided for the connection passages 61 of the connector 60, and the valves 81 may be independently opened and closed. Fluid 90 which is pressurized by a pump 80 may be provided to the pipes 83 which are connected with the valves 81. In exemplary embodiments, the pressurized fluid 90 may be a liquid or a gas.

According to an exemplary embodiment of a microfluidic device and a microfluidic system of the present invention, a fluid can move using a centrifugal force in a disk-shaped microfluidic device, furthermore, the fluid can move in an inward direction toward a central portion of the microfluidic device from a portion proximate to an outer perimeter thereof, and thereby effectively utilizing a relatively large area further away from the central portion. In addition, since additional valves for controlling a fluid movement between chambers is not required, there is no limitation in a rotation speed due to an operating condition of a capillary valve and the like during the fluid movement.

While the present invention has been particularly shown and described with reference to some exemplary embodiments thereof, it will be understood by those of ordinary skill in the art that various changes in form and details may be made therein without departing from the spirit and scope of the present invention as defined by the following claims.

What is claimed is:

1. A microfluidic device comprising:
a rotatable platform;
a plurality of connection ports disposed at a portion of the platform proximate to a shaft connection hole disposed in the platform, the plurality of connection ports capable of being connected to an external connector for selectively injecting and discharging a fluid and being closed by the external connector;
a trap chamber disposed at a portion of the platform further away from the shaft connection hole than the plurality of connection ports, the trap chamber including an inlet through which the liquid is directly injected into the trap chamber, an outlet and structures, the inlet connected with at least one connection port of the plurality of connection ports, the outlet connected with another connection port of the plurality of connection ports and the structures enlarging a contact area with the fluid; and
a temporary storage disposed at a portion of the platform further away from the shaft connection hole than the trap chamber, the temporary storage including an inlet and an outlet, the inlet connected with the outlet of the trap chamber and the outlet connected with another connection port of the plurality of connection ports, and the temporary storage stores the fluid discharged from the trap chamber by centrifugal force during a rotation of the platform,
wherein a channel is directly connected between the connection port of the trap chamber and the inlet of the trap chamber; and
wherein all the connection ports of the plurality of connection ports connected to the trap chamber and the temporary storage, are disposed closer to the shaft connection hole of the platform than the trap chamber and the temporary storage are disposed.

2. The microfluidic device of claim 1, wherein the rotatable platform is disk-shared.

3. The microfluidic device of claim 1, wherein the structures in the trap chamber are one of a plurality of packed beads and a plurality of pillar-shaped structures.

4. The microfluidic device of claim 1, wherein the temporary storage has a volume larger than or equal to an effective volume of the trap chamber, except for a volume of the structures in the trap chamber.

5. The microfluidic device of claim 1, wherein the plurality of connection ports, the trap chamber and the temporary storage are connected with each other through channels.

6. The microfluidic device of claim 1, further comprising a sample chamber disposed at a portion of the platform further away from the shaft connection hole than the plurality of connection ports, wherein an inlet of the sample chamber is connected with one connection port of the plurality of connection ports and an outlet of the sample chamber is connected with the inlet of the trap chamber, and the sample chamber stores a fluid sample therein.

7. A microfluidic device comprising:
a rotatable platform;
a plurality of connection ports disposed at a portion of the platform proximate to a shaft connection hole disposed in the platform, the plurality of connection ports capable of being connected to an external connector for selectively injecting and discharging a fluid and being closed by the external connector; and a plurality of trap chamber modules, wherein each trap chamber module of the plurality of trap chamber modules comprises:

a trap chamber disposed at a portion of the platform further away from the shaft connection hole than the plurality of connection ports, the trap chamber including an inlet, an outlet and structures, the inlet connected with at least one connection port of the plurality of connection ports, the outlet connected with another connection port of the plurality of connection ports and the structures enlarge a contact area with the fluid; and a temporary storage disposed at a portion of the platform further away from the shaft connection hole than the trap chamber, the temporary storage including an inlet and an outlet, the inlet connected with the outlet of the trap chamber and the outlet connected with another connection port of the plurality of connection ports, and the temporary storage stores the fluid discharged from the trap chamber by centrifugal force during a rotation of the platform, wherein an outlet of the temporary storage of an upstream trap chamber module is connected with an inlet of the trap chamber of a downstream trap chamber module corresponding to a movement direction of the fluid.

8. The microfluidic device of claim 7, wherein the structures in the trap chamber are one of a plurality of packed beads and a plurality of pillar-shaped structures.

9. The microfluidic device of claim 7, wherein the temporary storage has a volume larger than or equal to an effective volume of the trap chamber, except for a volume of the structures in the trap chamber.

10. The microfluidic device of claim 7, wherein the plurality of connection ports, the trap chamber and the temporary storage are connected with each other through channels.

11. The microfluidic device of claim 7, further comprising a sample chamber disposed at a portion of the platform further away from the shaft connection hole than the plurality of connection ports, wherein an inlet of the sample chamber is connected with one connection port of the plurality of connection ports and an outlet of the sample chamber is connected with the inlet of the trap chamber of a most upstream trap chamber module among the plurality of trap chamber modules, and the sample chamber stores a fluid sample therein.

12. A microfluidic system comprising:

a microfluidic device comprising:

a rotatable platform;

a plurality of connection ports disposed at a portion of the platform proximate to a shaft connection hole disposed in the platform, the plurality of connection ports capable of being connected to an external connector for selectively injecting and discharging a fluid and being closed by the external connector;

a trap chamber disposed at a portion of the platform further away from the shaft connection hole than the plurality of connection ports, the trap chamber including an inlet, an outlet and structures, the inlet connected with at least one connection port of the plurality of connection ports, the outlet connected with another connection port of the plurality of connection ports and the structures enlarge a contact area with the fluid; and a temporary storage disposed at a portion of the platform further away from the shaft connection hole than the trap chamber, the temporary storage including an inlet and an outlet, the inlet connected with the outlet of the trap chamber and the outlet connected with another connection port of the plurality of connection ports, and the temporary storage stores the fluid discharged from the trap chamber by centrifugal force during a rotation of the platform;

a rotating mount which controls a rotation speed and an angular position while supporting the microfluidic device; and a connector including a plurality of connection passages respectively corresponding to the plurality of connection ports disposed in the microfluidic device, and pipes and valves respectively connected with the plurality of connection passages, the connector capable of moving to be connected with and separated from the plurality of connection ports of the microfluidic device, wherein the connector is connected with the plurality of connection ports of the microfluidic device when moving fluid in the microfluidic device by using an external pump, fluid which is pressurized using the external pump is injected into at least one connection passage of the plurality of connection passages and remaining connection passages of the plurality of connection passages are selectively opened or closed by using the respective valves, and the connector is separated from the microfluidic device when moving the fluid in the microfluidic device by using centrifugal force.

13. The microfluidic system of claim 12, wherein the rotatable platform is disk-shaped.

14. The microfluidic system of claim 12, wherein the structures in the trap chamber are one of a plurality of packed beads and a plurality of pillar-shaped structures.

15. The microfluidic system of claim 12, wherein the temporary storage has a volume larger than or equal to an effective volume of the trap chamber, except for a volume of the structures in the trap chamber.

16. The microfluidic system of claim 12, wherein the plurality of connection ports, the trap chamber and the temporary storage are connected with each other through channels.

17. The microfluidic system of claim 12, further comprising a sample chamber disposed at a portion of the platform further away from the shaft connection hole than the plurality of connection ports, wherein an inlet of the sample chamber is connected with one connection port of the plurality of connection ports and an outlet of the sample chamber is connected with the inlet of the trap chamber, and the sample chamber stores a fluid sample therein.

18. A microfluidic system comprising:

a microfluidic device comprising:

a rotatable platform;

a plurality of connection ports disposed at a portion of the platform proximate to a shaft connection hole disposed in the platform, the plurality of connection ports capable of being connected to an external connector for selectively injecting and discharging a fluid and being closed by the external connector; and a plurality of trap chamber modules, wherein each trap chamber module of the plurality of trap chamber modules comprises:

a trap chamber disposed at a portion of the platform further away from the shaft connection hole than the plurality of connection ports, the trap chamber including an inlet, an outlet and structures, the inlet connected with at least one connection port of the plurality of connection ports, the outlet connected with another connection port of the plurality of connection ports and the structures enlarge a contact area with the fluid; and a temporary storage disposed at a portion of the platform further away from the shaft connection hole than the trap chamber, the temporary storage including an inlet and an outlet, the inlet connected with the outlet of the trap chamber and the outlet connected with another connection port of the plurality of connection ports, and the temporary storage stores the fluid discharged from the trap chamber by centrifugal force during a rotation of the platform, wherein an outlet of the temporary storage of an upstream trap chamber module is connected with an inlet of the trap chamber of a downstream trap chamber module corresponding to a movement direction of the fluid;

a rotating mount which controls a rotation speed and an angular position while supporting the microfluidic device; and a connector including a plurality of connection passages respectively corresponding to the plurality of connection ports disposed in the microfluidic device, and pipes and valves respectively connected with the plurality of connection passages, the connector capable of being connected with and separated from the plurality of connection ports of the microfluidic device, wherein the connector is connected with the plurality of connection ports of the microfluidic device when moving fluid in the microfluidic device by using an external pump, fluid which is pressurized by the external pump is injected into at least one connection passage of the plurality of connection passages and remaining connection passages of the plurality of connection passages are selectively opened or closed using the respective valves, and the connector is separated from the microfluidic device when moving the fluid in the microfluidic device by using centrifugal force.

19. The microfluidic system of claim 18, wherein the rotatable platform is disk-shaped.

20. The microfluidic system of claim 18, wherein the structures in the trap chamber are one of a plurality of packed beads and a plurality of pillar-shaped structures.

21. The microfluidic system of claim 18, wherein the temporary storage has a volume larger than or equal to an effective volume of the trap chamber, except for a volume of the structures in the trap chamber.

22. The microfluidic system of claim 18, wherein the plurality of connection ports, the trap chamber and the temporary storage are connected with each other through channels.

23. The microfluidic system of claim 19, further comprising a sample chamber disposed at a portion of the platform further away from the shaft connection hole than the plurality of connection ports, wherein an inlet of the sample chamber is connected with one connection port of the plurality of connection ports and an outlet of the sample chamber is connected with the inlet of the trap chamber of a most upstream trap chamber module among the plurality of trap chamber modules, and the sample chamber stores a fluid sample therein.

* * * * *